Nov. 1, 1966 R. BAYER 3,283,077

CIRCUIT ARRANGEMENT FOR LOUDSPEAKING INTERCOMMUNICATION SYSTEMS

Filed May 28, 1963 2 Sheets-Sheet 1

Inventor
R. BAYER
By Phillips A. Weiss
Attorney

CIRCUIT ARRANGEMENT FOR LOUDSPEAKING INTERCOMMUNICATION SYSTEMS

Filed May 28, 1963 2 Sheets-Sheet 2

Inventor
R. BAYER
By Philip A. Weiss
Attorney 3,283,077

CIRCUIT ARRANGEMENT FOR LOUDSPEAKING INTERCOMMUNICATION SYSTEMS

Rudolf Bayer, Vienna, Austria, assignor to International Standard Electric Corporation, New York, N.Y., a corporation of Delaware Filed May 28, 1963, Ser. No. 283,864
Claims priority, application Austria, June 7, 1962, A 4,591/62
9 Claims. (Cl. 179—1.4)

This invention relates to intercommunication systems and particularly to circuit arrangements for loudspeaking intercommunication systems.

Loudspeaking intercommunication systems are designed to amplify the signals received through the microphone to a level required by the loudspeaker; and to switch the connections so as to connect the communicating stations through an amplifier section.

The loudspeaking intercommunication systems can be divided into two classes. They are (1) the systems in which speech is transmitted in only one direction at a time; and (2) systems in which speech can be transmitted in both directions simultaneously. In the first class, means such as push-to-talk buttons or voice controlled circuitry must be provided to control the system. In the second class, acoustic or electric means must be provided to preclude feedback. The acoustic means includes the favorable location of the microphone and the loudspeaker. The electrical means includes mutually opposite voice-dependent control for the amplification in the two directions of speech transmission.

The switching for the loudspeaking intercommunication systems may be arranged in star connections or connected to provide communications between each of the individual stations. When star connections are used only one amplifier section is required and the switching arrangements are simpler.

In the systems providing communication links between each station decentralized amplifier sections may be used or the amplifier section may be centrally located and interconnected to the various stations through switch means. The switch means may be actuated by push-buttons or may be a central switching device.

The known circuit arrangements having decentralized amplifiers require a separate amplifier section for each station and for this reason are economically tolerable only for systems having a simple amplifier section.

The known circuit arrangements having only a central amplifier to which connection is made directly by the actuation of contacts at the stations, involve restrictions in the quality of service if the number of connecting wires is to be kept within economical limits.

The known circuit arrangements comprising a central switching section require a large expenditure of switch-gears (relays, rotary selector, cross bar and cross point switches) and can be economically made only for networks having a restricted number of stations so that generally the components provided are not optimally utilized.

An object of the present invention is to provide a loudspeaking intercommunication system wherein every station can communicate with each and every station in the system using only one central amplifier section and wherein pushbuttons control the switching connections.

Yet another object of this invention is to provide an inexpensive loudspeaking intercommunication system wherein the switching section of each station comprises, in addition to the buttons for establishing the connection, only two relays and only one relay is required in the central switching section. The number of relays is independent of the number of stations in the loudspeaking intercommunication system.

The inventive circuit arrangement affords a highly convenient operation. For instance, the connection can be established simply by pressing a button at the calling station. Listening in or interference by third stations can be prevented. The existing connection can be cleared simply by pressing a button at the calling or called station. Additional features frequently desired with intercommunication systems, such as signal lamps for indicating an existing connection at the stations connected to the amplifier section, signal lamps for indicating the engaged condition of the system, priority circuit switching means for individual stations, circuits for preventing listening-in, audible calling signal indicators, means for centrally clearing existing connections, may be provided for in the circuit arrangement according to the invention without difficulty and without special costs.

The circuit arrangement according to the invention for loudspeaking intercommunication systems or the like, comprising a central amplifier unit, is characterized in that each station has part of the make contacts of the preferably resilient line buttons connected in parallel to each other and in series with a relay and indirectly or directly connected to a voltage source. A make contact of the relay is connected in series with the other part of the make contacts of the line buttons between a lead from the voltage source and the line leads. Another relay is connected between the line lead associated with the station and the other lead from the voltage source. Contacts of the one relay and contacts of the other relay are provided for connecting the sound transducer or transducers to one or the other side of the central amplifier unit. In stations having only hearing facilities, the make contacts of the line buttons and said one relay with contacts are omitted, if desired.

It is further provided according to the invention that said one relay is indirectly connected by an auxiliary relay of the central amplifier unit to a lead of the voltage source. To avoid interference by third stations, said one relay is divided into two partial windings, one of which holds itself by a separate contact after response so that a current displacement results, which prevents a response of any further, similar relays.

The second relay may have a separate contact whereby the second relay is held after the response thereof.

Besides, each station may comprise signal lamps arranged to be connected between and disconnected from the leads to the voltage source by contacts of one relay and by contacts of the second relay, respectively.

According to another feature of the invention, each station may comprise at least one clearing contact in the self-holding circuit of said one relay winding and at least one clearing contact in a circuit between an auxiliary lead and the other lead from the voltage source.

According to another feature of the invention, the circuit between the auxiliary lead and the other lead from the voltage source may include in series with the clearing contact a make contact of said other relay, which make contact can be conductively by-passed to include the station in a priority circuit so that existing connections can be interrupted at any time.

According to another modification, the invention is characterized in that the central amplifier unit comprises a switch contact, by which the power supply of said one relay of a station can be interrupted so that an existing connection can be centrally cleared.

The invention also provides switch contacts included in the station in the current path from the microphone to the central amplifier unit, and the desired connection is established only when said switch contacts are operated by a separate element, such as a button, so that unauthorized listening-in is avoided.

The invention will now be described more in detail with reference to illustrative embodiments shown in the drawing, wherein.

Figure 1:
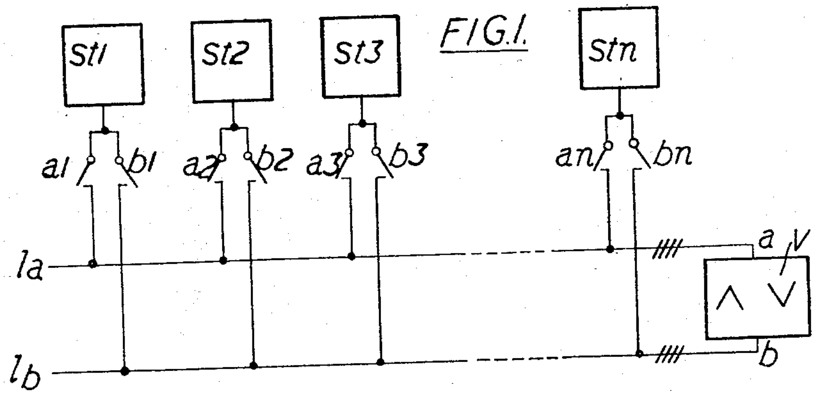
FIG. 1 is the basic circuit diagram showing the connection of the sound transducers to a common amplifier unit.

According to FIG. 1, each system comprises a central amplifier unit V having terminal sets *a* and *b*, connecting wires from the connecting sides to the stations S*t*1, S*t*2, S*t*3 . . . S*tn*. The connecting lines may comprise two, three or four leads each, depending on the requirements of the central amplifier unit. The stations are shown connected by means of contact $a_1$, $b_1$ or $a_2$, $b_2$ or $a_3$, $b_3$ . . . or ${}_na$, $b_n$ to the terminal sets *a* and *b* of the central amplifier unit V.

Figure 2:
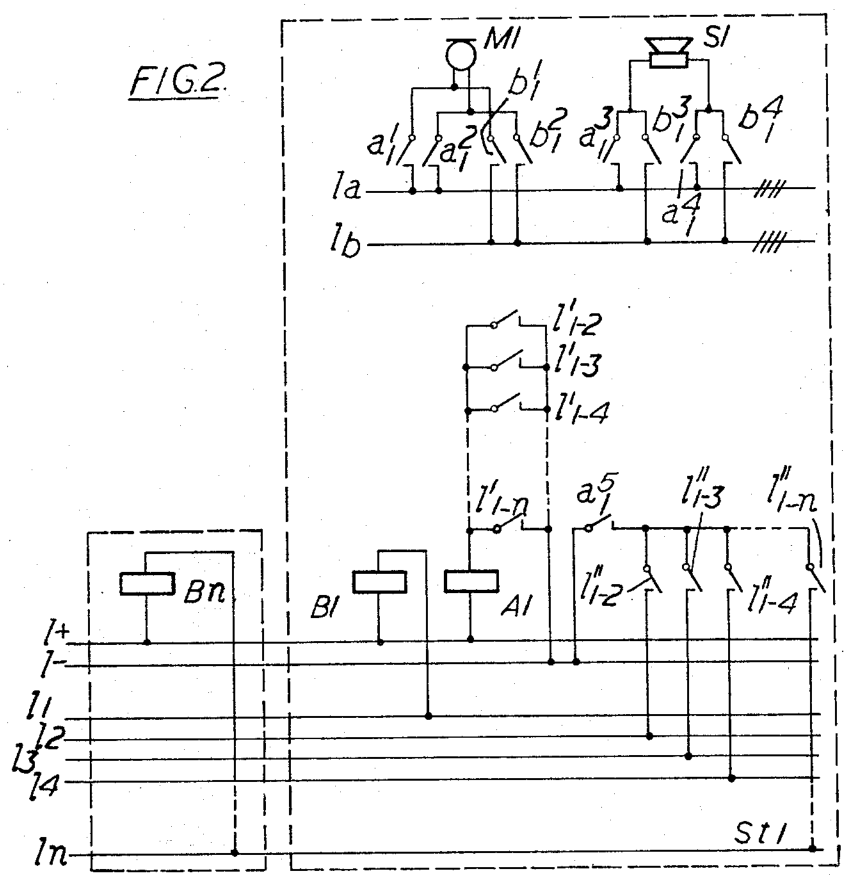
FIG. 2 shows in more detail a basic circuit diagram illustrating the connection between two stations.

According to FIG. 2, each station includes two relays. Station S*t*1 includes a relay $A_1$ and a relay $B_1$. Station S*tn* includes also a relay $A_n$ (not shown) and a relay $B_n$. Relay $A_1$ will be operated in station $St_1$ when the same is calling another station. Relay $B_1$ will be operated in station $St_1$ when the same is being called by another station.

With reference to FIG. 2, if the line button $L_{1-n}$, not shown, is pressed in station $St_1$ to call station $St_n$, the contacts $l'_{1-n}$ and $l''_{1-n}$ of the line button $L_{1-n}$ will be closed. Closing the contact $l'_{1-n}$ will establish the following circuit; lead $l_+$, relay $A_1$, contact $l'_{1-n}$, lead $l_-$.

Upon response of the relay $A_1$ its contact $a_1^4$ will be closed to establish the following circuit: lead $l_-$, contact $\alpha_1^4$, contact $l''_{1-n}$, relay $B_n$ of station S*tn*, lead $l_+$. This will cause a response of relay $B_n$.

Response of relay $A_1$ will also cause contacts $a_1^1$ and $a_1^2$ to be closed so that the microphone $M_1$ is connected to line $l_a$ leading to the terminal set *a* of the central amplifier unit. The response of relay $A_1$ causes also the contacts $a_1^3$ and $a_1^4$ to be closed so that the loudspeaker $S_1$ is also connected to the terminal set *a* of the central amplifier unit V.

Station S*tn* includes a circuit arrangement similar to that shown in the upper part of station S*t*1. The response of the relay $B_n$ in station S*tn* will cause a microphone $M_n$, not shown, and a loudspeaker $S_n$, not shown, to be connected to the terminal set *b* of the central amplifier unit V by contacts $b_n^1$ and $b_n^2$ (not shown) and contacts $b_n^3$ and $b_n^4$, respectively.

As is shown in the example illustrated in FIG. 2, each station may be separately provided with a microphone and a loudspeaker, which are connected by separate lines (four leads) to the central amplifier unit. Alternatively, each station may comprise only one sound transducer, which is alternatingly used as a microphone or loudspeaker and is connected by only one line (two leads) to the central amplifier unit.

Figure 3:
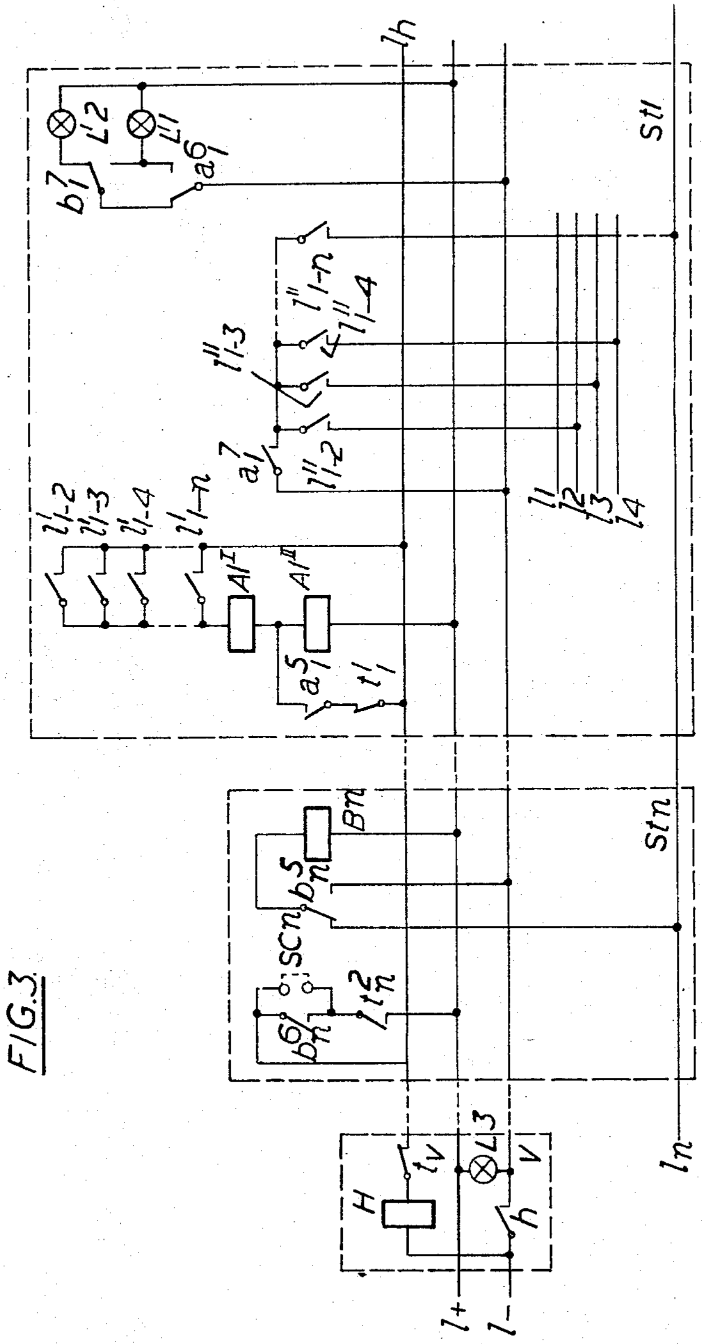
FIG. 3 is a basic circuit diagram showing a connection of two stations to the central unit and the associated additional apparatus.

FIG. 3 shows more in detail an example of a circuit arrangement. This figure shows only those circuit components which are necessary for understanding the function of the system. Circuit elements similar to those shown in FIG. 2 are provided with the same reference characters.

To prevent an interference of a connection established, e.g., between the calling station S*t*1 and the called station S*tn*, by third stations included in the system, it must be ensured that only a single A relay in the system can respond. This is achieved in that the voltage is applied to the A relay of the stations from the source of current through an auxiliary relay H in the central amplifier section and that the A relay itself has two part windings, one of which is short-circuited when the A relay responds.

The windings of the A relay and of the auxiliary relay are so designed that an A relay can respond first, whereafter the voltage drop in the winding of the auxiliary relay is so large that the operated A relay is still self-holding but another A relay will not be sufficiently energized for the operation thereof.

With reference to FIG. 3, when it is assumed, for instance, that station S*t*1 wants to establish a connection to station S*tn*, the preferably resilient line button $L_{1-n}$ (not shown) is pressed to close the contacts $l'_{1-n}$ and $l''_{1-n}$ so that the following circuit is established first: lead $l_+$, relay winding $A_1^{II}$, relay winding $A_1^{I}$, contact $l'_{1-n}$, contact $t_v$, relay H, lead $l_-$. In this circuit, relay H responds to connect its contact to this circuit. The energizing of the relay winding $A_1^{I}$ and relay winding $A_1^{II}$ causes the contact $a_1^5$ of the same relay to short-circuit the relay winding $A_1^{I}$ so that the A relay becomes self-holding and, as mentioned above, an energizing of an A relay in another station is prevented. Because of the self-holding of the A relay the line buttons may be resilient.

The energization of relay A causes further the closing of its contact $a_1^4$. By the actuation of the line button $L_{1-n}$ (not shown), the contact $l''_{1-o}$ has also been closed to establish the following circuit: lead $l_-$, contact *h*, contact $a_1^7$, contact $l''_{1-n}$, lead $l_n$, contact $b_n^5$, relay $B_n$, lead $l_+$. This causes the relay $B_n$ in station S*tn* to respond and to hold itself by its own contact $b_n^5$.

Because the B relay B holds itself, the line key $L_{1-n}$ (as well as all others) may be a resilient button.

The stations may be provided with signal lamps. For instance, the signal lamps $L'_1$ and $L'_2$ are shown in station S*t*1. In the illustrative embodiment described, contact $a_1^6$ is in the right-hand position when the relay $A_1$ responds. As a result, the signal lamp $L'_1$ shines because it is included in the following circuit: lead $l_-$, contact *h*, contact $a_1^6$, signal lamp $L'_1$, lead $l_+$. If station S*t*1 is the called station, the following circuit will be established: lead $l_-$, contact *h*, contact $a_1^6$, iontait $b_1^7$, signal lamp $L'_1$, lead $l_+$, so that signal lamp $L'_1$ shines again. If station S*t*1 is neither the called station nor the calling one and when a talking connection is established, which is indicated by the closed contact *h*, the signal lamp $L'_2$ will shine because it is included in the circuit: lead $l_-$, contact *h*, contact $a_1^6$, contact $b_1^7$, signal lamp $L'_2$, lead $l_+$. This indicates that S*t*1 must not and cannot establish a talking connection.

The signal lamp $L_3$ in the central amplifier unit V will shine when contact *h* is closed.

Signal lamps $L'_2$ and $L_3$ are suitably, e.g., red (engaged) and signal lamp $L_1$ is suitably white (established connection).

When the conversation has been terminated, it must be possible to clear the existing connection by actions at the calling station and/or the called one. The button $T_1$ (not shown) in station S*t*1 has the contact $t_1^1$ and the button $T_n$ (not shown) in station S*tn* has the contact $t_n^1$ (not shown).

Contact $t_1^1$ interrupts the circuit for energizing the relay winding $A_1^{II}$. As a result, the relay $A_1$ releases and by its contact $a_1^4$ opens the connection which includes the lead $l_n$.

Contact $t_n^2$ is closed to establish a conductive connection from lead $l_h$ to lead $l_+$ so that relay $A_1$ is also de-energized and releases.

The release of the relay $A_1$ causes a release of the auxiliary relay H and a de-energization of lead $l_-$, so that relay $B_n$ releases and the signal lamps $L'_1$, $L'_2$ and $L_3$ are extinguished.

To establish a priority circuit for individual stations, the contact $b_n^6$ (or the contact $b_1^6$, $b_2^6$, $b_3^6$ . . . ; not shown) is shorted with a shorting bar $SC_n$ so that any existing connection can be cleared at any time by the contact $t_n^2$.

If a clearing of the connection at the end of the conversation has been forgotten at the calling station as well as at the called one, the system will remain blocked for all other stations unless the same have priority circuit switching means. To enable the system to be cleared, the central amplifier unit comprises a special clearing button $T_v$ (not shown), the contact $t_v$ of which interrupts the application of voltage to lead $l_h$ and thus to the relay $A_1$.

In loudspeaking intercommunication systems, stations are sometimes required which cannot call but can only be called. Such stations may be provided with a circuit arrangement according to the invention in which the following circuit components are omitted: A relay, line buttons $L_{1-2}$ to $L_{1-n}$, engagement indicating lamp $L'_2$.

Means to prevent an unobserved listening into stations may be provided in a simple manner by causing the B relay of a station to connect only the loudspeaker system, not the microphone of the station directly to the amplifier part of the system. The microphone lead is then provided with switch contacts, which are operated by a separate element of the station (microphone release button) to enable the lead to be connected by the B relay. While the principles of the invention have been described in connection with specific apparatus and applications, it is to be understood that this description is made only by way of example and not as a limitation on the scope of the invention.

I claim:

1. A circuit arrangement for transducer equipped loudspeaking intercommunication systems having a plurality of stations, voltage source means having positive and negative terminals, positive and negative leads common to all of said stations connected to said terminals, individual leads coupled to the transducer at each of said stations, line leads common to all of said stations for carrying communications therebetween, connecting leads individual to each of said stations traversing all of said stations, a central amplifier unit connected to said line leads, first and second relay means at each of said stations, calling means at each of said stations comprising means for connecting said first relay means in calling ones of said stations to said positive and negative leads for operating said first relay means, means responsive to the operation of said calling means and said first relay in said calling station for connecting said second relay means in called ones of said stations to said positive and negative leads for operating second relay, and means responsive to the operation of said first and second relays for connecting said individual leads to said common line leads at said calling and said called stations to communicatively interconnect said calling one of said stations and said called one of said stations.

2. The circuit arrangement of claim 1 wherein said calling means at each of said stations comprises at least a first and a second set of make contacts with each set of make contacts having at least one contact identified with each of the plurality of stations other than said calling station, said first set of make contacts connected in parallel to each other and in series with said first relay means, said parallel contacts and said first relay means bridging said positive and negative leads, whereby said first relay means in said calling station is operated responsive to the operation of any of said first set of contact means in said calling station, said second set of make contacts having one make contact connected between each of said connecting leads and make contact means on said first relay means, means connecting said make contact means on said first relay means to said negative lead, means connecting said second relay means at said called station between the connecting lead individual to said called station and said positive lead whereby said second relay means in said called station is operated responsive to the operation of the contact in said calling station identified with said called station.

3. The circuit arrangement of claim 2 wherein said central amplifier unit includes auxiliary relay means, means for connecting said auxiliary relay means in series between said first set of parallel contacts and said negative lead, and means wherein said first relay means comprises first and second windings, means responsive to the operation of said first relay through both said first and said second windings in series for shorting out one of said windings, means responsive to the operation of said first relay, means for holding said first relay means and said auxiliary relay means operated through said other winding and preventing the operation of any other of said first relay means.

4. The circuit arrangement of claim 3 wherein separate contact means are provided for said second relay means for holding said second relay means operated.

5. The circuit arrangement of claim 4 and signal lamp means at each of said stations, contacts on said first and second relay means at each station for operating said signal lamp means to indicate the condition of operation of said first relay means or second relay means and said auxiliary relay means at each of said stations.

6. The circuit arrangement of claim 5 wherein means are provided at said calling station for releasing said held, first, second and auxiliary relay means.

7. The circuit arrangement of claim 5 wherein means are provided at said called station for releasing said held, first, second and auxiliary relay means.

8. The circuit arrangement of claim 5 wherein lamp means are provided at said common amplifier means to indicate the operation of said auxiliary relay means.

9. The circuit arrangement of claim 5 and means associated with said second relay in at least some of said stations for connecting said auxiliary relay means directly between said negative and positive leads by shorting out any operated first relay means for preempting said common line leads thereby providing priority circuit means.

References Cited by the Examiner

UNITED STATES PATENTS 3,091,667 5/1963 Noren ---------------- 179—40

KATHLEEN H. CLAFFY, *Primary Examiner.*

S. J. BOR, *Assistant Examiner.*